US006374981B1

(12) United States Patent
Gschwendtner et al.

(10) Patent No.: US 6,374,981 B1
(45) Date of Patent: Apr. 23, 2002

(54) SUPPORT CONSTRUCTION FOR LONG ESCALATORS AND MOVING WALKWAYS

(75) Inventors: Gero Gschwendtner; David Krampl, both of Vienna (AT)

(73) Assignee: Invento AG, Hergiswil (CH)

( * ) Notice: Subject to any disclaimer, the term of this patent is extended or adjusted under 35 U.S.C. 154(b) by 0 days.

(21) Appl. No.: 09/630,171

(22) Filed: Aug. 1, 2000

(30) Foreign Application Priority Data

Aug. 6, 1999 (EP) .......................................... 99810702

(51) Int. Cl.[7] .......................... B65G 15/00; B65G 21/00

(52) U.S. Cl. ..................................... 198/321; 198/860.3

(58) Field of Search ............................. 198/860.1, 321, 198/860.3

(56) References Cited

U.S. PATENT DOCUMENTS 4,179,020 A * 12/1979 Heusler et al. ............. 198/326
4,674,619 A 6/1987 Nakazawa et al.
4,871,056 A * 10/1989 Saito .......................... 198/335
5,697,486 A * 12/1997 Krampl ...................... 198/332
6,105,748 A 8/2000 Pallinger et al.

FOREIGN PATENT DOCUMENTS

JP 10-45368 * 10/1998 ........... B66B/23/22

* cited by examiner

*Primary Examiner*—Kenneth W. Noland
*Assistant Examiner*—Kenneth W Bower
(74) *Attorney, Agent, or Firm*—Schweitzer Cornman Gross & Bondell LLP

(57) ABSTRACT

An escalator and moving walkway construction has spaced first and second basic wall supports arranged laterally of a step or plate conveying run. The rigidity of such a support construction is enhanced, in the case of use with large support widths, in that at least one respective supplementary wall support is laterally flange-mounted to each of the basic wall supports of the support construction.

7 Claims, 3 Drawing Sheets

SUPPORT CONSTRUCTION FOR LONG ESCALATORS AND MOVING WALKWAYS

The invention relates to a support construction for escalators and moving walkways which substantially consists of two wall supports, which are arranged laterally of a step or plate conveying run and oriented predominantly in the longitudinal and vertical directions and which are connected together by crossbeams. The invention has constructional adaptations for use for large support widths.

BACKGROUND OF THE INVENTION

Escalators or moving walkways, which in free-supporting manners bridge over large distances, require executions of the support constructions which are stiff in bending or torsion in order to avoid disturbing bending or torsional oscillations in operation. Such oscillations can be excited not only by periodic pulses from the drive or the circulating step conveying run, but also by passengers walking along the run. Large bending or torsional oscillations which are disturbing or even risk-laden can be most easily avoided by an execution of the support construction having high rigidity and low mass, which creates correspondingly high natural frequencies.

Conventional support constructions for escalators and moving walkways substantially consist of so-called wall supports which are arranged at both sides of a step or plate conveying run and are connected together by crossbeams and which are predominantly oriented in the longitudinal and vertical directions. These constructions are usually produced in a framework mode of construction from rolled profile members or rectangular tubes, but can also be fabricated in accordance with other methods, such as, for example, in solid wall or in sandwich modes of construction. Standardized wall supports are, for reasons of cost optimization, so designed that the rigidity of the support constructions produced therefrom is for the predominant part sufficient for all bridging distances typically encountered. For the remaining constructional realizations with larger bridging distances, costly special solutions usually have to be used, such as support constructions with wall supports of greater height, support constructions of thicker profile members or support constructions with stiffening supplementary constructions.

A solution is known from EP 0 366 019 Al in which so-called sub-bracing —additional sub-trusses of wire cables or tie rods —produces the required increase in bending stiffness. Unfavorable results of this solution are that the aesthetic appearance of such an escalator can be perceived as unsatisfactory, that the construction demands more installation space in vertical direction, and that special additional components have to be designed and produced for the sub-bracing.

The present invention therefore has the object of achieving an increase in bending and torsional stiffness of a support construction, which is needed for long escalators and moving walkways, at low cost in terms of production and logistics and with the avoidance of the afore-described disadvantages.

BRIEF DESCRIPTION OF THE INVENTION

According to the invention the foregoing and other objects are met in that at least one respective, usually constructional identical, supplementary wall support is flange-mounted to each of the two basic wall supports of the support construction. In this manner there is created from each single wall support and a supplementary wall support a double wall support which imparts correspondingly increased rigidity to the support construction.

The invention exhibits substantial advantages relative to constructions in which the geometry or the constructional materials of the wall supports are respectively matched to the bridging length or special constructions are implemented. All wall supports can be produced according to the same standardized methods from identical tube materials with the same machine settings and gauge sizes. Tube materials and processing tools are required to be kept in store only for a single constructional execution. For mass production, it is only necessary to stock prefabricated wall supports in one form of construction. Further, the aesthetic appearance of the escalator or moving walkway in which the invention is embodied is not impaired by increased height or by visible additional constructions.

An additional advantage of the described principle of reinforcement is that it is usable for the most diverse kinds of constructional executions of wall supports, including, for example, framework, solid plate, bending profile member and composite panel modes of construction.

In certain circumstances further advantages may result from the use of supplementary wall supports of a type of construction differing from that of the basic wall support, i.e., for example, a supplementary wall support of a solid plate mode of construction being flange-mounted to a basic wall support having a framework mode of construction.

In situations where unforseen disturbing oscillations occur after placing the equipment into operation, such oscillation can be eliminated by subsequent attachment of supplementary wall supports.

BRIEF OPTION OF THE DRAWING

A fuller understanding of the invention will be achieved upon consideration of the embodiments of the invention which are more closely explained in the following in conjunction with reference to FIGS. 1 to 6, wherein.

DETAILED DESCRIPTION OF THE INVENTION

Figure 1:
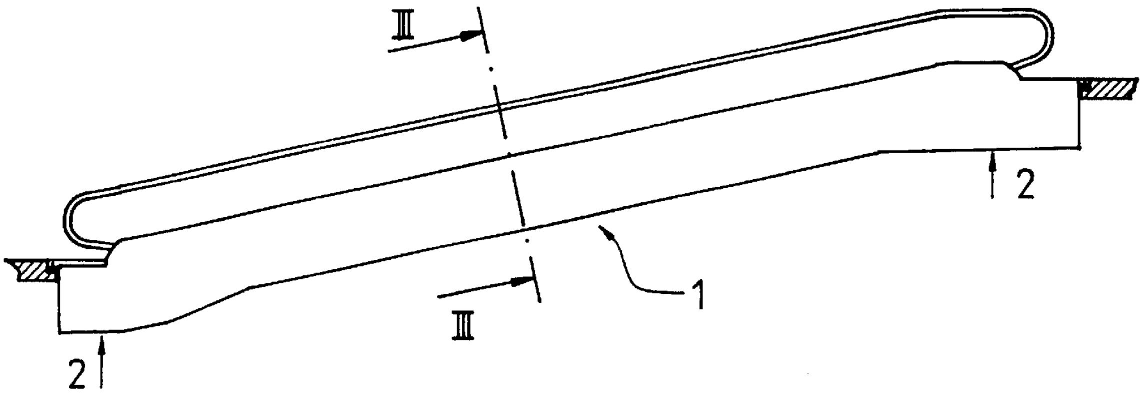
FIG. 1 shows a side view of a moving walkway with the support zones thereof.

A conventional rising, moving walkway 1 is illustrated in side elevation view in FIG. 1, wherein two vertical arrows mark the position of its supports 2 by the building and indicate that the zone of the support construction of the moving walkway which is disposed therebetween is loaded as a free bending girder.

Figure 2:
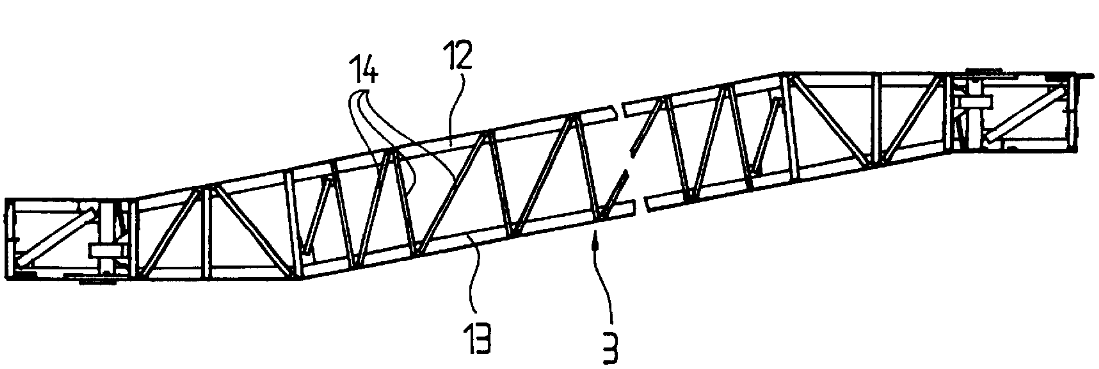
FIG. 2 shows a wall support of a support construction having a framework mode of construction.

FIG. 2 shows the support construction of a moving walkway in accordance with the invention with a framework mode of construction, which substantially consists of two wall supports connected by means of crossbeams. Illustrated is a construction, according to the invention, with double wall supports. Not visible are junctions, which may be required by the length of the construction, in the tension and compression trusses 12 and 13 of the wall supports, which due to limited raw material lengths as well as reasons arising from manufacturing or assembly engineering, are inevitable. The angular profile trusses 12 and 13 may be provided at the junctions with welded-on flanges, by way of which the wall supports are assembled together by means of screw connections during assembly.

Figure 3:
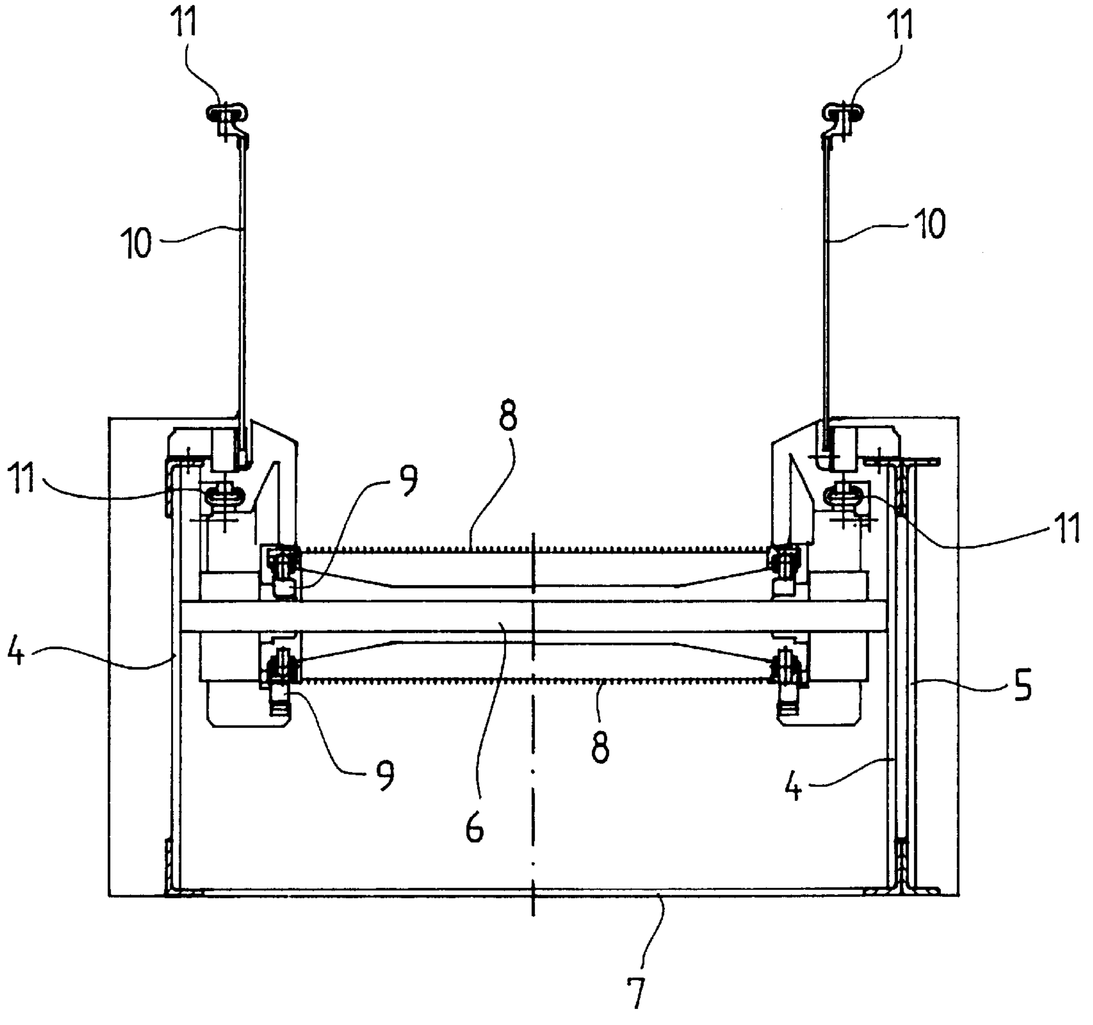
FIG. 3 shows a cross-section through a moving walkway taken along line III—III in FIG. 1. The lefthand side of the cross-section shows an unreinforced wall support, which righthand side shows the invention reinforced wall support (double wall support) of a framework mode of construction.

FIG. 3 shows a cross-section through a moving walkway, wherein the lefthand half of the cross-section represents a standard execution of the support construction with basic wall supports 4 and the righthand half represents the execution reinforced with a supplementary wall support S according to the invention. Moreover, to be recognized are the upper and lower crossbeams 6 and 7, which together with the lateral wall supports 4 and 5 form the support construction, conveying plates 8 of the circulating plate conveyor chain, guide rails 9 for the upper and lower runs of the plate conveyor chain, as well as two so-called glass balustrades 10 (rails) and two circulating handrail strips 11.

Figure 4:
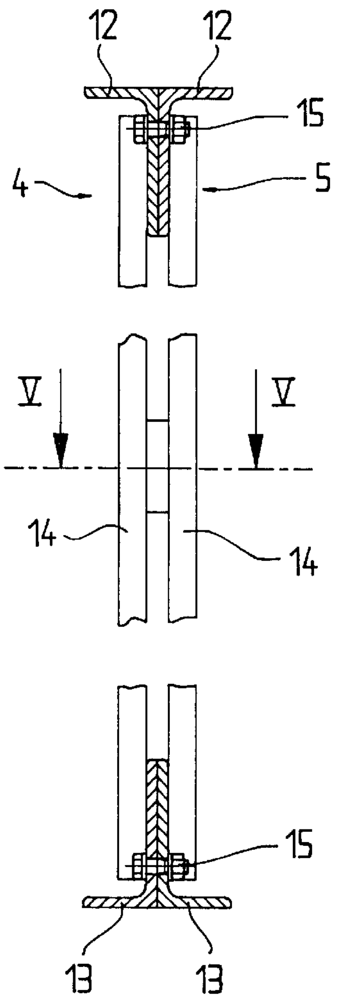
FIG. 4 shows an enlarged cross-section view of a double wall support of the framework mode of construction.
Figure 5:
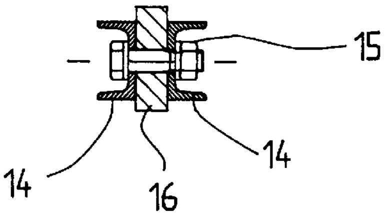
FIG. 5 shows a section through a strut of the double wall support taken along line V—V in FIG. 4.

FIG. 4 shows an enlarged cross-section through a double wall support which is formed by the lateral flange-mounting of a supplementary wall support 5 to a base wall support 4. The wall support is illustrated in a framework mode of construction, each support consisting of an upper angle profile compression truss 12, a lower angle profile tension truss 13 and the framework strut 14 firmly welded thereto. It is clearly apparent from FIG. 4 how the double wall support arises through the flange-mounting together of two wall supports which are constructionally identical, but built up in mirror image, wherein the basic wall support forming one side of the support construction is each time identical with the supplementary wall support forming the other side. The connection between the basic and supplementary wall supports is effected by means of screw connections 15, but can also be executed by means of rivets or welds. Sectional illustration V—V (FIG. 5) shows one of these connections as a screw-connection 15 in the region of the framework struts 14, wherein an intermediate member 16 is inserted between the struts. The screw connections are particularly useful to allow the supplementary wall supports to be mounted to the basic wall supports after installation for retrofitting, since screw holes in the basic wall supports can be provided at the time of installation for subsequent use.

Similar wall supports can also be realized from rectangular hollow profile members. They are suitable as basic and supplementary wall supports and enable identical, symmetrical construction therefrom for lefthand and righthand constructional executions.

Figure 6:
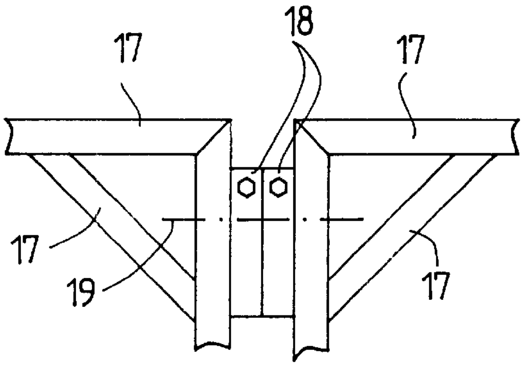
FIG. 6 shows a construction of a double wall support of rectangular steel tubes.

FIG. 6 shows a form of construction of wall supports of the present invention which are built up from rectangular hollow profile members 17 in a framework arrangement. The wall support components have, at the junctions caused by their length, intermediate flanges 18 which are tightened against one another by means of screw connections 19 during assembly.

Figure 7:
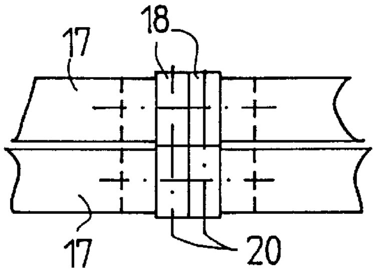
FIG. 7 shows a plan view of the double wall support of FIG. 6.

In FIG. 7 it is illustrated how, with wall supports of rectangular hollow profile members 17, the supplementary wall supports are flange-mounted laterally to the basic wall supports by screw connections 20 in the region of the connecting flanges 18.

Figure 8:
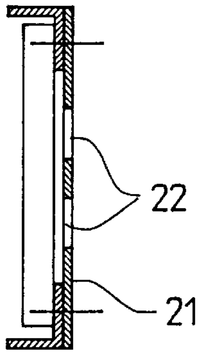
FIG. 8 shows a section through a double wall support consisting of a basic wall support of a framework mode of construction and a supplementary wall support having a solid plate mode of construction.

A further possible form of execution of double wall supports of the invention is illustrated in FIG. 8, wherein the supplementary wall supports 21 consist of solid steel plates in facing contact with the basic wall supports. These are, where required, provided with passage openings 22 and connected with the basic wall supports by screws.

Figure 9:
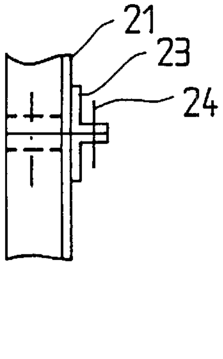
FIG. 9 shows a plan view of the double wall support of FIG. 8.

FIG. 9 shows how the supplementary wall support 21 can be assembled together at junctions in the basic wall supports by way of welded-on angle flanges 23 by means of screw connections 24.

Obviously, different combinations can be realized by the different forms of construction of the wall supports with respect to use as basic or supplementary wall supports.

We claim:

1. A support construction for escalators and moving walkways, comprising spaced first and second basic wall supports, arranged laterally of a main run of a step or plate conveying run and oriented predominantly in longitudinal and vertical directions, crossbeams connecting the first and second basic wall supports, and a respective supplementary wall support extending along the main run adjacent to each of the basic wall supports and flange-mounted to the adjacent basic wall support of the support construction to increase the rigidity thereof.

2. The support construction for escalators and moving walkways according to claim 1, characterized in that the basic wall supports and supplementary wall supports are constructed as framework supports.

3. The support construction for escalators and moving walkways according to claim 2, characterized in that the basic wall supports and supplementary wall supports are a framework mode of construction formed from open rolled profile members or rectangular hollow profile members.

4. The support construction for escalators and moving walkways according to claim 1, characterized in that at least one of the basic wall supports and supplementary wall supports are each constructed as a solid plate construction.

5. The support construction for escalators and moving walkways according to claim 1, 2, 3, or 4, characterized in that the constructional executions of the basic wall supports and the supplementary wall supports are identical.

6. The support construction for escalators and moving walkways according to claim 1, 2, 3, or 4, characterized in that the basic wall supports and supplementary wall supports are laterally flange-mounted to one another at spaced locations through upper and lower truss elements located between the basic and supplementary wall supports.

7. The support construction for escalators and moving walkways according to claim 1, 2, 3, or 4, characterized in that the basic wall supports have prepared connecting points adapted and construed to allow the flange-mounting of the supplementary wall supports to the basic wall supports after an installation of the escalator or moving walkway has been carried out.

* * * * *